Oct. 21, 1930.  A. J. MUNSON  1,779,285
PLANTER SHOE SCRAPER
Filed May 2, 1930
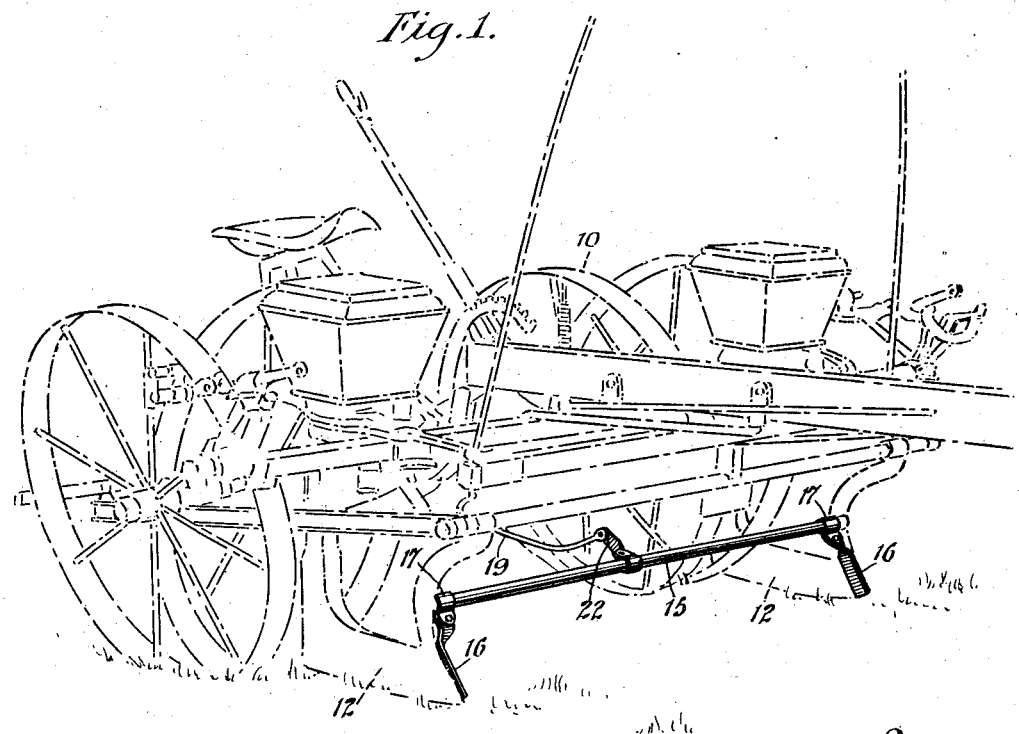
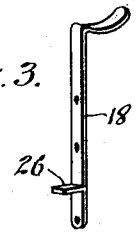
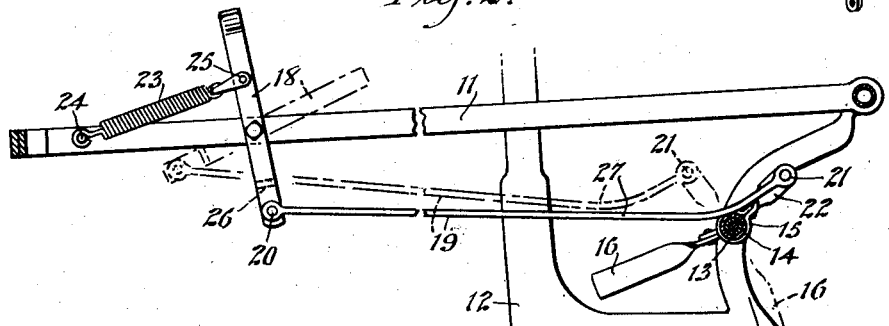
WITNESSES
INVENTOR
Aaron J. Munson.
BY
ATTORNEYS.

Patented Oct. 21, 1930

1,779,285

UNITED STATES PATENT OFFICE

AARON J. MUNSON, OF GARRETSON, SOUTH DAKOTA

PLANTER-SHOE SCRAPER

Application filed May 2, 1930. Serial No. 449,315.

The invention relates to an attachment or accessory adapted for use on agricultural implements or machines used for the purpose of planting seeds or sowing grain, or for such machinery which employs appurtenances or shoes for making furrows or ditches in which grain or seeds are deposited.

In order that the benefits and advantages of the invention may be fully understood and appreciated, attention is called to the following facts: Planter shoes in action will gather trash, such as straw, hay, weeds, roots of weeds, clover, etc. These materials together with moist or wet dirt will accumulate on the planter shoes causing undesirable relatively wide ditches which the following wheels cannot cover, and, as a consequence, seeds or grain deposited therein will be washed out of the ditches by heavy rain. These accumulations on the shoes extend back beyond them and drag the seeds or grain from their proper course.

The principal object of the invention is to overcome the above mentioned drawbacks or disadvantages by the provision of a simple, efficient and reliable means which is easy to install and operate, for the purpose of removing undersirable materials which gather on shoes of the indicated character while the machine of which they form parts is in operation.

The nature of the invention and its distinguishing features and advantages will appear when the following specification is read in connection with the accompanying drawing, in which Figure 1 is a perspective view of a corn planter with a scraper constructed in accordance with the invention applied thereto, the planter being shown in dot and dash lines;

Figure 2 is a longitudinal section showing the scraper in the up or normal position;

Figure 3 is a perspective view of the foot lever.

Referring now to the drawing, it will be apparent that there is shown a planter 10, the same being shown in dot and dash lines. The planter 10 includes a frame 11 which supports shoes 12 which extend longitudinally at opposite sides of the planter in spaced parallel relation. The shoes 12 may be of the stub type, or may be of the rounded pull type. The shoes 12 are designed and adapted for making furrows or ditches in which are deposited grain or seeds, after which the furrows or ditches are closed by wheels forming parts of the planter. The shoes 12 are rigidly maintained in their set relation by a cross rod 13 secured to the shoes and arranged between the same. A pipe or tubular member 14 is arranged on the rod 13 to supplement the rod in maintaining the shoes in the set relation.

In accordance with the present invention, the scraper attachment or accessory is provided for removing undesirable materials which gather on the shoes 12 while the planter is in operation. The attachment or accessory includes a pipe or tubular member 15 which is arranged on the tubular member 14 and is supported by the latter for turning movement thereon. Scrapers 16 are secured to the tubular member 15 in any practical manner, and in the present instance are secured by the employment of clips or clamping members 17. One scraper 16 is provided for each of the shoes 12, and in the present instance each scraper 16 is adapted to traverse the inside surface of the forward end of the related scraper by the turning movement of the tubular member 15. Means is provided for causing the turning movement of the tubular member 15 in one direction to cause the scrapers 16 to perform their functions. The said means comprises a foot lever 18 mounted on the frame 11, and a connecting rod 19 having one end pivotally connected as at 20 with the lower end of the lever 18, and its opposite end pivotally connected as at 21 with a short rigid member or arm 22 rigidly secured to the tubular member 15. In order to return the lever 18 to a normal position, and therefore also return the scrapers 16 to normal or elevated positions, there is provided means in the form of a retractile spring 23 which has one end thereof connected in any suitable manner, as at 24, with the frame 11 and its opposite end connected in any suitable manner, as at 25, with the lever 18. In Figure 2 of the drawing, the parts are shown normally disposed. The lever 18 has a lateral projection or stop 26 thereon which is positioned to engage the frame 11 to limit the movement of the lever 18 in the forward direction in the shoe scraping operation. The rod 19 is curved or bent as at 27 so as to engage the tubular member 15 to limit the movement of the lever 18 rearwardly to its normal position, as shown in Figure 2. It will be apparent that as soon as the pressure of the foot on the lever 18 is withdrawn, the spring 23 will function to return the lever 18 to its normal position and incidentally raise or elevate the scrapers 16 through the intervention of the rod 19, arm 22 and tubular member 15.

From the foregoing it will be apparent that undesirable material may be removed from the shoes 12 at will. The scrapers 16 coming in contact with the shoes 12 will loosen the material which will utimately be removed partly by gravitation, but mostly by friction, as the planter travels over the ground. It will be obvious that the scraper attachment will serve advantageously on grain planters and machines designed for planting potatoes and other vegetaables. It enables a better grade of work to be achieved while saving time and expense.

Claims:

1. A planter or the like having the combination of a frame, furrow or ditch making shoes secured to said frame, a part mounted on said frame and having turning movement, scrapers rigidly mounted on said turning part, said scrapers being positioned relatively to said shoes to scrape undesirable material from the shoes by turning said part, a lever mounted on said frame connected with said turning part and operable to cause the turning movement of said part for the stated purpose, yieldable means connected with said frame and lever to return the latter to a normal position and to thereby turn said part to a position to normally retain said scrapers in elevated positions, and a stop integral with the lever and engageable with said frame to limit the movement of the lever.

2. A planter or the like having the combination of a frame, a furrow or ditch making shoes secured to said frame, a part mounted on said frame and having turning movement, scrapers rigidly mounted on said turning part, said scrapers being positioned relatively to said shoes to scrape undesirable material from the shoes by turning said part, a lever mounted on said frame, a rod connected with said lever and turning part to cause the turning movement of said part by the operation of the lever for the stated purpose, yieldable means connected with said frame and lever to return the latter to a normal position and to thereby turn said part to a position to normally retain said scrapers in elevated positions, said rod being engageable with said turning part to limit the movement of the lever in one direction, and a stop integral with the lever and engageable with the frame to limit the movement of the lever in the opposite direction.

3. An attachment of the class described, comprising an arbor, scrapers rigidly secured to said arbor, a lever connected with said arbor to turn it, a spring connected with said lever to retract it, and a stop integral with the lever engageable with a suitable stationary part to limit the movement of the lever.

AARON J. MUNSON.